May 29, 1923.
L. MEDVED
CLOTHESLINE REEL
Filed July 3, 1922
1,456,704
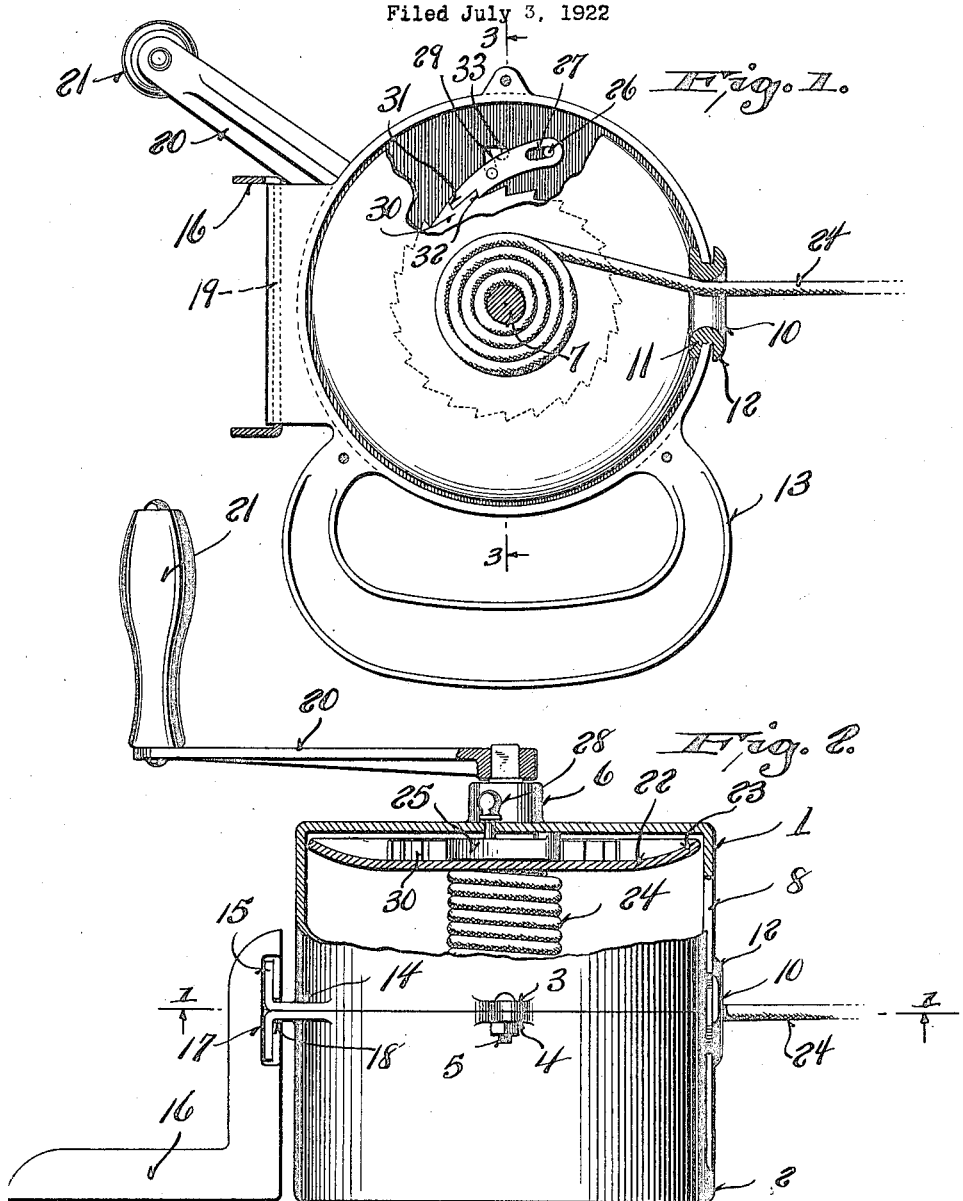
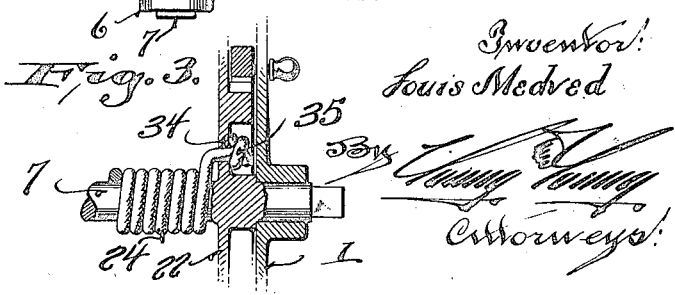

Patented May 29, 1923.

1,456,704

UNITED STATES PATENT OFFICE.

LOUIS MEDVED, OF MILWAUKEE, WISCONSIN.

CLOTHESLINE REEL.

Application filed July 3, 1922. Serial No. 572,641.

*To all whom it may concern:*

Be it known that I, LOUIS MEDVED, a citizen of the United States, and resident of Milwaukee, in the county of Milwaukee and State of Wisconsin, have invented certain new and useful Improvements in Clothesline Reels; and I do hereby declare that the following is a full, clear, and exact description thereof.
This invention relates to clothes line reels, and is particularly directed to a reel adapted to be operated by hand.

Objects of this invention are to provide a clothes line reel which is portable, which may be temporarily attached at one end of the yard, for instance, which is adapted to keep the line off the ground while it is being reeled up, and which is provided with a guiding eyelet adapted to be moved by the line itself and to relieve the line of the major portion of the wear.

Further objects are to provide a portable clothes line reel, which is of extremely light and durable construction, and which is provided with a handle or grip readily accessible, and which may be cheaply and readily manufactured at a minimum expense.

An embodiment of the invention is shown in the accompanying drawings, in which:
Figure 1 is an end view of the device with one-half of the casing removed and with a portion of the mechanism broken away to more clearly illustrate the construction, such figure corresponding to a sectional view on the line 1—1 of Figure 2.

Figure 2 is a plan view, partly in section, illustrating the apparatus in the position of temporary attachment.

Figure 3 is a fragmentary sectional view on the line 3—3 of Figure 1.

The device comprises a two-part casing formed of the portions 1 and 2, preferably stamped or punched from sheet material. Each of these portions is provided with alined perforated lugs 3 and 4 adapted to be bolted together, as indicated at 5, so as to completely house the internal mechanism. Each of these portions is provided with an outwardly extending hub 6 adapted to receive a transverse operating shaft 7. The sections 1 and 2 are provided with slotted portions or cut-outs 8, which are adapted to aline, as indicated in Figure 2, when the two sections are bolted together. An eyelet 10 is mounted within this slotted portion and is provided with internal and external flanges 11 and 12 adapted to cooperate with the upper and lower edges of the slotted portion and to freely slide back and forth across the slotted opening. The bottom portion of each of the sections 1 and 2 may be provided with an integral half handle member 13, so that when the sections are bolted together, a rounded handle or grip is provided. If, however, it is desired to form the handle as a separate entity from the remaining portions of the apparatus, it is obvious that such handle may be attached to projecting lugs in a well-known manner.

In order to temporarily support the device, the rear portion of each of the sections is provided with a rearwardly extending projection 14, which terminates in a laterally projecting portion 15. These projecting members together form a T-shaped attaching clip integrally formed with the main portion or casings 1 and 2, as may be seen from Figure 2.

Any desired type of bracket, such as the angular bracket 16, may be provided and may be secured to any fixed support. This bracket is channel shape in section, as may be seen from Figure 1, and is provided with a slot 17 through its upper flange, and with a vertical slot 18 through the web portion 19, indicated in dotted lines in Figure 1.

It will be seen, therefore, that it is a comparatively simple matter to temporarily attach the reel to the support, as it is merely necessary to elevate the reel slightly and to slide the T-shaped rearward projection into the slot of the bracket 16. It is of course understood that any other desired type of securing means may be employed in place of the bracket and T-shaped means described. For instance, a hook and eye may be employed, as will be readily understood.

The operating or transverse shaft 7 has a crank arm 20 secured thereto in any desired manner, as, for example, by screw threads, a squared section, or by being pressed thereon. This crank 20 is provided with an operating handle 21, whereby the shaft 7 may be given rotary motion.

Within the casing or housing the shaft is provided at each end with guiding flanges 22, which terminate in outwardly bowed portions 23 adapted to guide the line 24 and prevent its wedging between the casing and the rotary portion of the apparatus. Adjacent one side of the device, preferably that side at which the crank is located, a locking dog 25 is provided and is pivotally carried upon a pin 26 secured to the outer wall of the housing. This pin 26 cooperates with a relatively long slot 27 formed in the dog. An operating handle or pin 28 is rigidly secured to the dog and has a spindle portion extending through an L-shaped slot 29 formed in the outer wall of the casing.

It is to be noted that when the dog is placed in the position shown in Figure 1, it is adapted to cooperate with a ratchet wheel 30, rigidly secured to the shaft 7. If it is desired, this dog may be provided with a shouldered end 31 and with an intermediately shouldered portion 32, to thereby cooperate simultaneously with two of the teeth of the ratchet wheel, thereby prolonging the life of the device.

However, it is sometimes desirable, as on reeling the line, to move the dog out of operative position and to retain it in inoperative position. To accomplish this, the L-shaped slot 29 is provided with a slightly enlarged off-set portion 33, into which the shank of the dog operating pin 28 is adapted to be positioned. It will be seen from Figure 1 that the dog may be given an upward and rearward motion, due to the loose connection of the pin 26 and slot 27, and that the shank of the pin 28 may be freely moved into the enlargement 33.

The line 24 may be of any desired material and is passed through the metallic eyelet 10 and wrapped about the operating shaft 7. Its terminal end portion is passed through the aperture 34 formed in the flange 22, and is knotted, as indicated at 35, to thereby firmly retain the line upon the drum or winding portion.

After the clothes line reel has been attached to the temporary support, the line may be tensioned by operating the crank,— the pawl cooperating with the ratchet wheel to lock the drum against reverse rotation. In this manner, a very efficient line tightener is provided which may be readily and easily operated to secure the desired tension upon the clothes line. It is to be noted, also, that this tension may be increased, if, after the line has been loaded, it is found that such line sags.

It will be seen, therefore, that a clothes line reel has been provided, which is freely portable and which may be temporarily locked to a fixed support. It will also be seen that by providing the handle portion 13 beneath the reel, that such reel may be easily positioned upon a relatively high support, as it is merely necessary for the operator to slightly elevate the reel in attaching and detaching it.

It will also be seen that when it is desired to reel in the line, it is merely necessary to slightly elevate the entire device, thereby detaching it from the support and thereafter to reel in the line, by turning the crank,— the operator slowly walking along towards the other end of the line and thereby keeping the line out of contact with the ground.

While a specific form of the invention has been described in detail, it is to be understood that such description is to be taken merely as an illustration of one form of the invention and that the invention is to be limited only as set forth in the appended claims.

I claim:—

1. A clothes line reel comprising a two-part stamped casing having rearwardly and outwardly projecting ears, a drum mounted within said casing, an external handle for operating said drum, a line passed into said casing and secured to said drum, a fixed support having a slot therein adapted to receive said ears to temporarily hold said winding reel in position, pawl and ratchet means for locking said drum in adjusted position, and a handle located below said casing and having two complementary half sections each formed integrally with the corresponding part of the two part casing.

2. A clothes line reel comprising a casing, a transverse shaft mounted therein, a clothes line passed into said casing and wound upon said shaft, an operating crank for said shaft externally mounted with reference to said casing, a ratchet wheel secured to said shaft, a dog mounted within said casing and having an elongated slot, a pin secured to said casing and positioned within said slot, and an operating pin secured to said dog and extending outwardly through said casing, said casing having an L-shaped slot adapted to accommodate said pin, whereby said dog may occupy an operative position with respect to said ratchet wheel or may be locked in inoperative position.

In testimony that I claim the foregoing I have hereunto set my hand at Milwaukee, in the county of Milwaukee and State of Wisconsin.

LOUIS MEDVED.